United States Patent
Lin et al.

(10) Patent No.: US 8,966,372 B2
(45) Date of Patent: Feb. 24, 2015

(54) SYSTEMS AND METHODS FOR PERFORMING GEOTAGGING DURING VIDEO PLAYBACK

(75) Inventors: Meng Hui Lin, New Taipei (TW); Huang-Hsin Wu, New Taipei (TW)

(73) Assignee: Cyberlink Corp., Shindian, Taipei (TW)

( * ) Notice: Subject to any disclaimer, the term of this patent is extended or adjusted under 35 U.S.C. 154(b) by 1051 days.

(21) Appl. No.: 13/024,803

(22) Filed: Feb. 10, 2011

(65) Prior Publication Data

US 2012/0210227 A1    Aug. 16, 2012

(51) Int. Cl.
*G06F 3/00* (2006.01)
*H04N 21/475* (2011.01)
*G11B 27/034* (2006.01)
*G11B 27/10* (2006.01)
*G11B 27/28* (2006.01)
*G11B 27/30* (2006.01)
*H04N 9/82* (2006.01)
*H04N 21/472* (2011.01)
*H04N 21/4788* (2011.01)
*H04N 21/81* (2011.01)

(52) U.S. Cl.
CPC ............ *H04N 21/475* (2013.01); *G11B 27/034* (2013.01); *G11B 27/105* (2013.01); *G11B 27/28* (2013.01); *G11B 27/3027* (2013.01); *H04N 9/8233* (2013.01); *H04N 21/47217* (2013.01); *H04N 21/4788* (2013.01); *H04N 21/8133* (2013.01)
USPC ............................ 715/723; 715/846; 707/802

(58) Field of Classification Search
CPC ................. G06K 9/00785; G06T 5/50; H04N 19/00266; H04N 21/23418; H04N 21/235; H04N 21/44008
See application file for complete search history.

(56) References Cited

U.S. PATENT DOCUMENTS

2008/0313570 A1* 12/2008 Shamma et al. .............. 715/846
2011/0055283 A1*  3/2011 Wallace et al. ............... 707/802

* cited by examiner

*Primary Examiner* — Boris Pesin
*Assistant Examiner* — Ayesha Huertas Torres
(74) *Attorney, Agent, or Firm* — McClure, Qualey & Rodack, LLP

(57) ABSTRACT

A method is implemented in a video playback system that includes a video editing interface for assigning geotagging data to a video. The method comprises receiving, by the video playback system, the video from a tangible storage medium. The method further comprises reading metadata associated with the video, selecting a frame from the video, providing a user interface with a map, displaying a default location of the selected frame on the map according to the metadata, receiving geotagging data via the user interface, and associating the geotagging data with the selected frame of the video to generate a geo-based timeline.

41 Claims, 9 Drawing Sheets

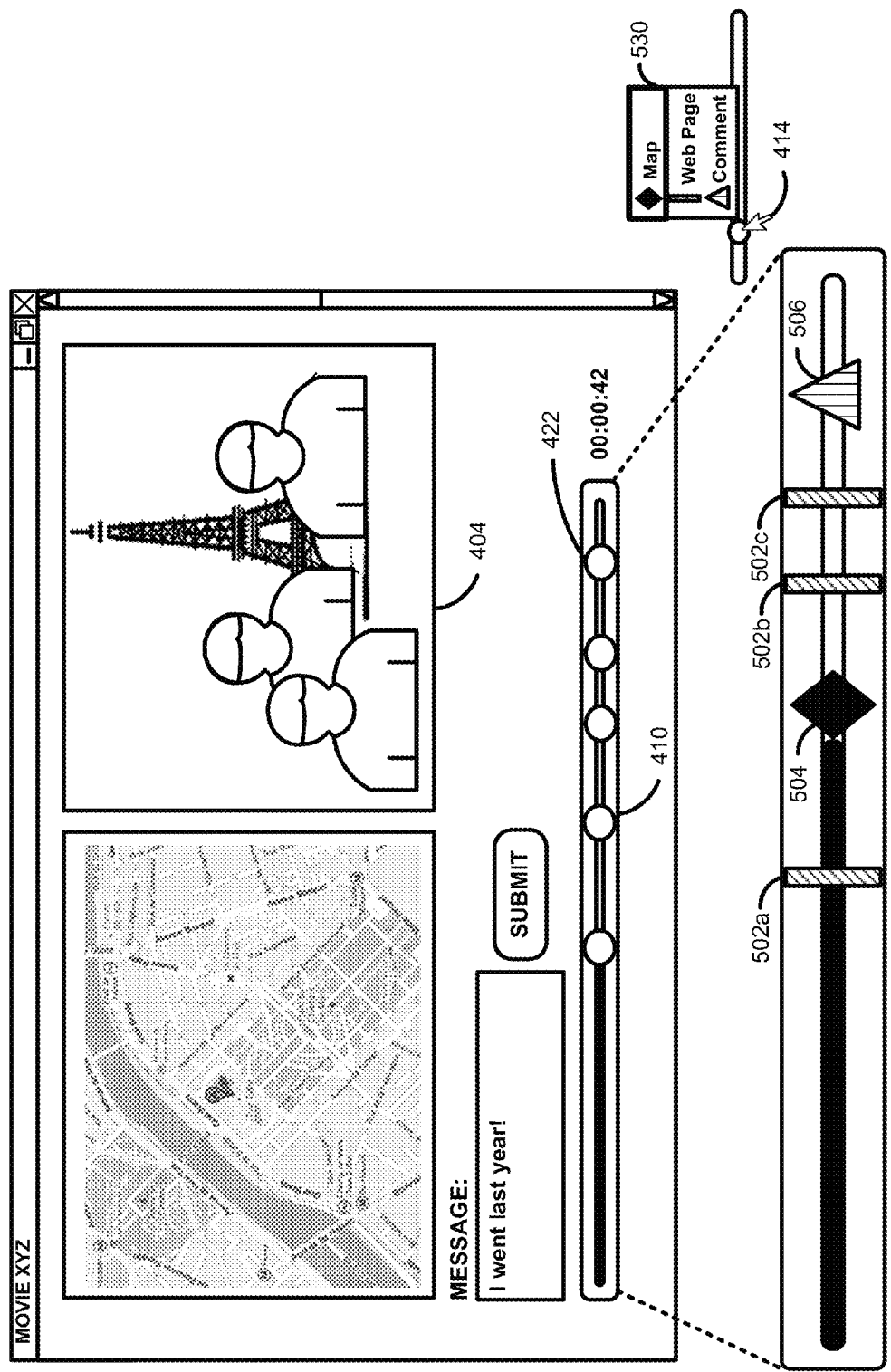

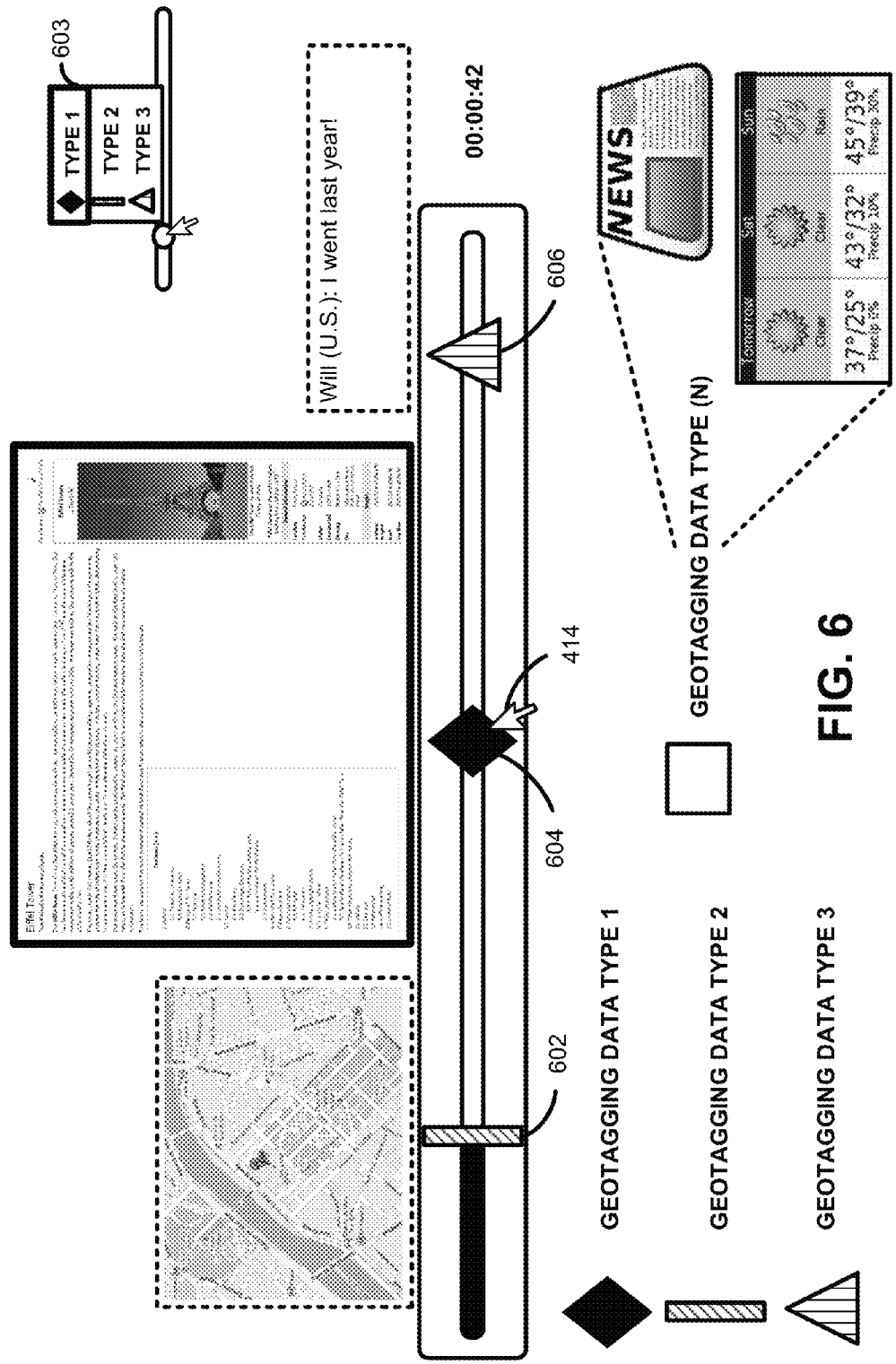

SYSTEMS AND METHODS FOR PERFORMING GEOTAGGING DURING VIDEO PLAYBACK

TECHNICAL FIELD

The present disclosure generally relates to multimedia content and more particularly, to systems and methods for performing geotagging during video playback.

BACKGROUND

Over the years, digital video content has gained increasing popularity with consumers. With the ever-growing amount of audio and video content available to consumers through the Internet using computers, smart phones, and other sources, consumers have access to a vast amount of content and programming. Furthermore, many devices (e.g., PCs, DVD recorders) and services that are readily available allow consumers to record, time-shift or view on-demand video and audio content. Many off-the-shelf video editing applications provide users with the capability to incorporate special effects into captured images, audio and video. Some video editing/playback applications allow users to incorporate timed comments and tags at specific points within the video. Generally, video content can be stored in any number of common formats such as MPEG-1, MPEG-2, or DV (digital video), for example. The availability of multimedia content in a vast array of digital formats has facilitated distribution of multimedia content because of the high degree of portability. However, one perceived shortcoming with current video playback applications is that there is generally limited means for incorporating geographical data during the playback experience for others to later view.

SUMMARY

Briefly described, one embodiment, among others, is a method implemented in a video playback system for assigning geotagging data to a video. The method comprises receiving, by the video playback system, the video from a tangible storage medium. The method further comprises reading metadata associated with the video, selecting a frame from the video, providing a user interface with a map, and displaying a default location of the selected frame on the map according to the metadata. The method further comprises receiving geotagging data via the user interface and associating the geotagging data with the selected frame of the video to generate a geo-based timeline.

Another embodiment is a system for assigning geotagging data to a video. The system comprises a receiver configured to receive the video from a tangible storage medium and metadata associated with the video, a scene identifier configured to identify scenes based on frames within the video, and a user interface module configured to provide a user interface with a map, where the user interface module is further configured to display a default location of the selected frame on the map according to the metadata. The system further comprises a geotagger configured to associate the geotagging data with tagged scenes within the video and generate a geo-based timeline.

Another embodiment is a method that comprises receiving, by the video playback system, a video from a tangible storage medium and identifying scenes within the video, wherein the scenes are associated with different geographical locations. The method further comprises providing a user interface with a timeline corresponding to the scenes associated with the different geographical locations, receiving geotagging data via the user interface for one or more scenes in the video, and associating the geotagging data with the one or more scenes in the video associated with different geographical locations.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 5-6 illustrate the use of various visual markers on the geo-based timeline of FIG. 4.

DETAILED DESCRIPTION

Figure 1:
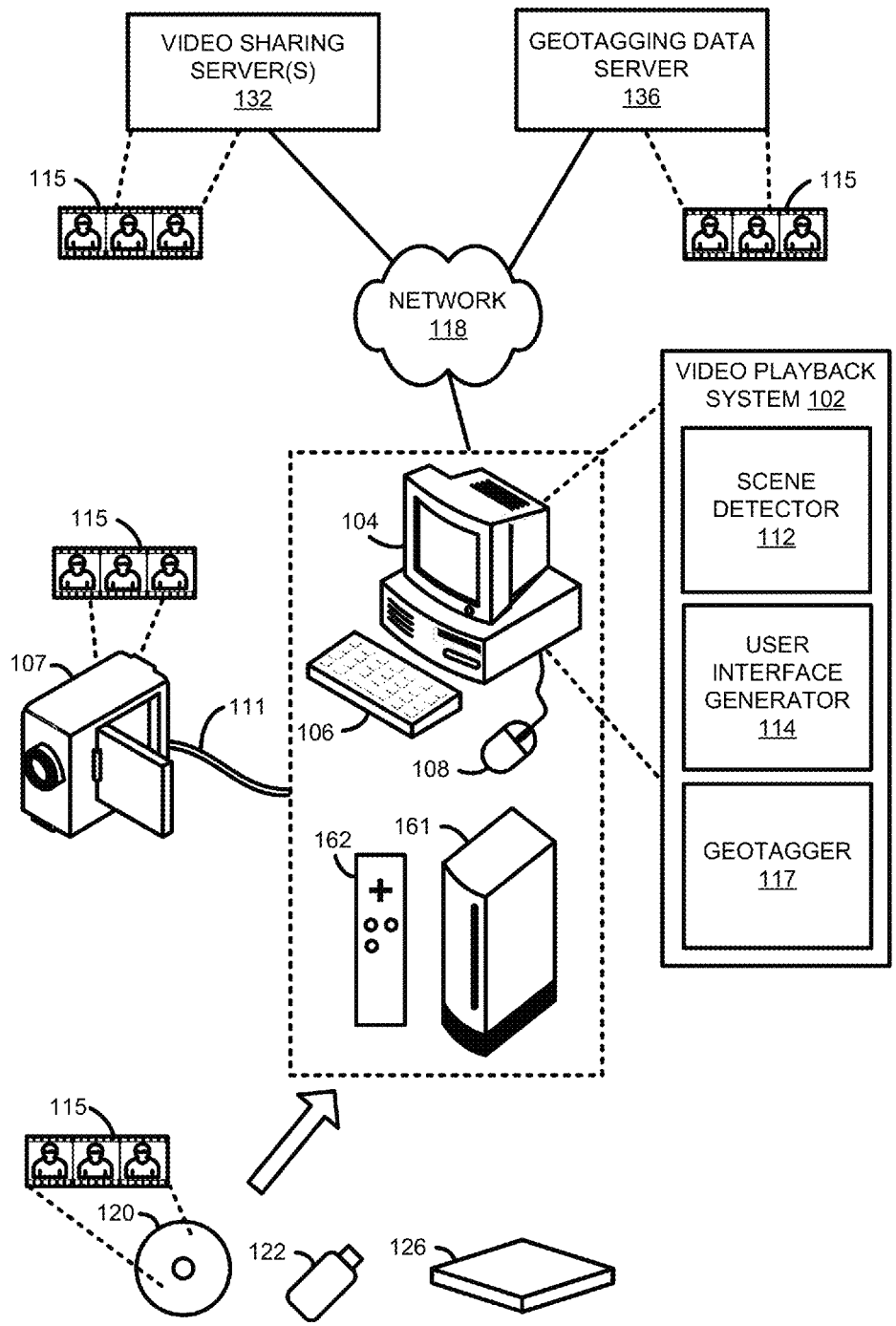
FIG. 1 is a block diagram of a video playback system configured to incorporate geotagging data into a received video.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Various embodiments are described for providing an intuitive method for editing and assigning geotagging data to various frames of video in a video playback system. Geotagging data generally refers to geographical identification metadata that may comprise such information as coordinates, names of locations, and so on. The embodiments described provide a fast and efficient means for performing geotagging, thereby allowing users to quickly acquire and/or submit location information to enhance the viewing experience. Note that while geotagging techniques exist, these techniques generally focus on extracting information from GPS data. The embodiments described herein are directed to techniques that rely on other sources for geographical data, including, but not limited to, video titles and/or commentary from users. An intuitive user interface is provided that allows a user to both view and navigate through different scenes in a video using a geo-based timeline. As a non-limiting example, one embodiment is a method implemented in a video playback system for assigning geotagging data to a video. A video is received by the video playback system, and the frames within the video are parsed. Scenes with the frames are identified, and a user interface is provided that includes a geo-based timeline according to the identified scenes marked. Geotagging data is received from a user through the user interface, and the geotagging data is associated with the video.

A description of a system for performing geotagging in a video playback system is now described followed by a discussion of the operation of the components within the system. FIG. 1 is a block diagram of a video playback system 102 configured to incorporate geotagging data into a received video. The video playback system 102 may be embodied, for example, as a desktop computer, computer workstation, laptop, or other computing platform. In other embodiments, the video playback system 102 may be embodied as a video gaming console 161, which includes a video game controller 162 for receiving user preferences. For such embodiments, the video gaming console 161 may be connected to a television (not shown) or other display.

The video playback system 102 includes a display 104 and input devices such as a keyboard 106 and a mouse 108. The video playback system 102 comprises a scene detector 112 configured to identify scenes within the received video content 115. The video playback system 102 further comprises a user interface generator 114 configured to provide a user interface for receiving geotagging data from a user. The geotagger 117 in the video playback system 102 associates received geotagging data with particular scenes. Note that for some embodiments, the video playback system 102 may be embodied as a software player (such as CyberLink's PowerDVD® application), where the software player is stored on a non-transitory computer readable medium and executed by a processing device, as will be described in more detail later. In accordance with other embodiments, the video playback system 102 may be embodied as an online video sharing platform similar to that provided by YouTube®.

The video playback system 102 is configured to receive video content 115 stored on a storage medium such as by way of example and without limitation, a compact disc (CD) 120, a universal serial bus (USB) flash drive 122, and an external hard drive 126. As non-limiting examples, the video playback system 102 may be configured to read media content encoded in such formats as Digital Video Disc (DVD), Video CD (VCD), High Definition DVD (HD-DVD), BLU-RAY Disc, and China Blue High-Definition (CBHD) stored on a storage medium 120, 122, 126. In some embodiments, the video playback system 102 may also be configured to read multimedia content from managed copies 122 of an HD-DVD or a BLU-RAY Disc. As depicted in FIG. 1, the video playback system 102 may also receive video content 115 directly from a digital camera 107 via a cable 111 or some other interface. The video playback system 102 may support any one of a number of common computer interfaces, such as, but not limited to IEEE-1394 High Performance Serial Bus (Firewire), USB, a serial connection, and a parallel connection.

The digital camera 107 may also be coupled to the video playback system 102 over a wireless connection or other communication path. The video playback system 102 may be coupled to a network 118, such as the Internet or a local area network (LAN). Through the network 118, the video playback system 102 may receive video content 115 from another computing system or from video sharing servers 132 such as, for example, YouTube® and other content providers. Generally, the video sharing server will include one or more video sharing pages rendered on the video playback system 102. The video playback system 102 may also be communicatively coupled to a geotagging data server 136 via the network 118 for receiving default geotagging data, as described in more detail later. As shown, the video playback system 102 may also receive video content 115 from the geotagging data server 136.

Figure 2:
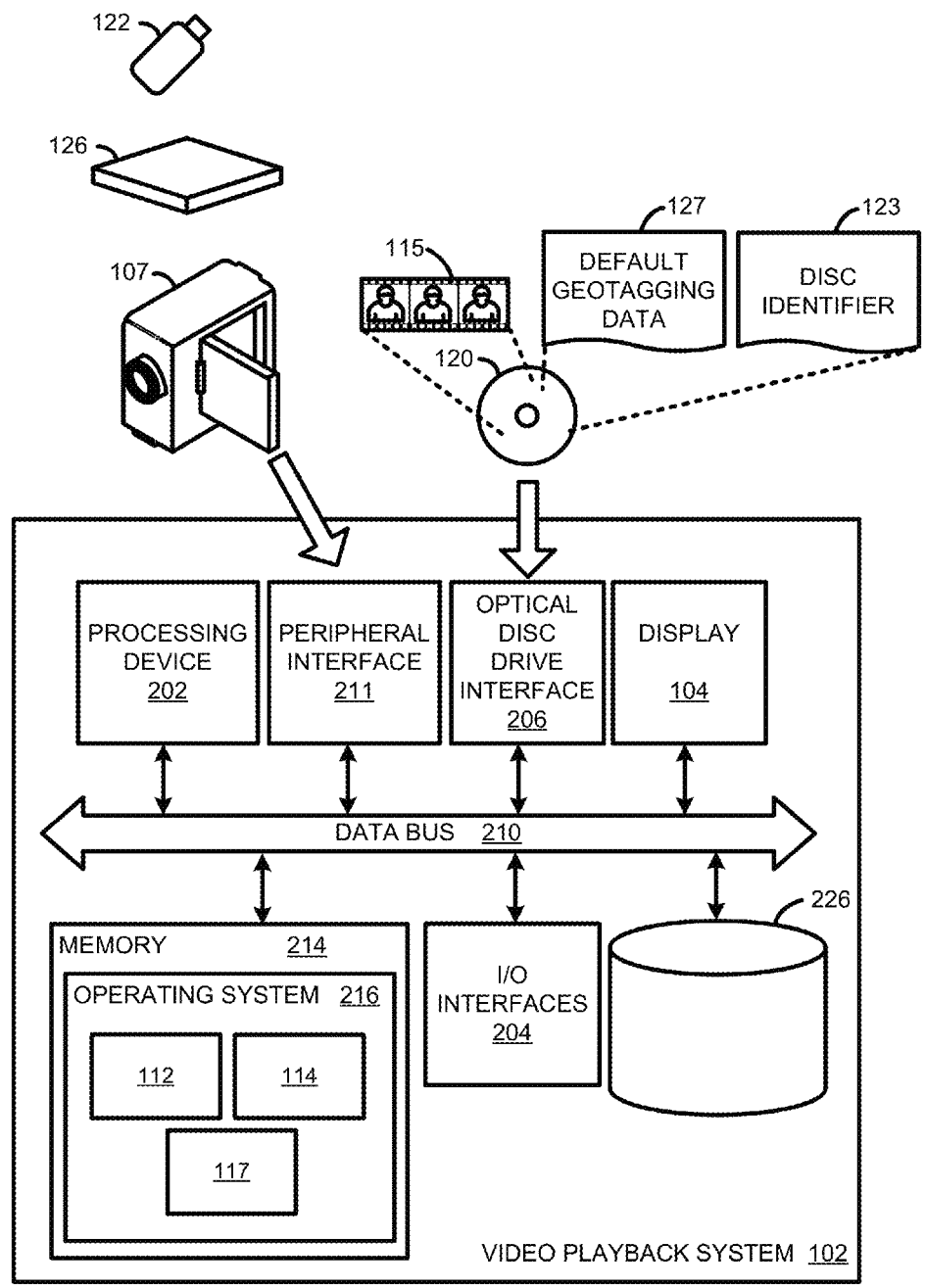
FIG. 2 illustrates an embodiment of the video playback system shown in FIG. 1.

FIG. 2 illustrates an embodiment of the video playback system 102 shown in FIG. 1. The video playback system 102 may be embodied in any one of a wide variety of wired and/or wireless computing devices, such as a desktop computer, portable computer, dedicated server computer, multiprocessor computing device, smart phone, personal digital assistant (PDA), digital camera, and so forth. As shown in FIG. 2, the video playback system 102 comprises memory 214, a processing device 202, a number of input/output interfaces 204, an optical disc drive interface 206, a display 104, a peripheral interface 211, and mass storage 226, wherein each of these devices are connected across a local data bus 210. As shown, the video playback system 102 may be configured to receive video content 115 via the peripheral interface 211 or the optical disc drive interface 206. Note, however, that the video playback system 102 may also receive video content 115 from the Internet via a network interface (not shown).

The processing device 202 may include any custom made or commercially available processor, a central processing unit (CPU) or an auxiliary processor among several processors associated with the video playback system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components 112, 114, 117 of the video playback system 102 depicted in FIG. 1. In accordance with such embodiments, the components 112, 114, 117 are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the video playback system 102 comprises a personal computer, these components may interface with one or more user input devices 204, which may comprise a keyboard or a mouse, as shown in FIG. 2. The display 104 may comprise a computer monitor, a plasma screen for a PC, a liquid crystal display (LCD) on a hand held device, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
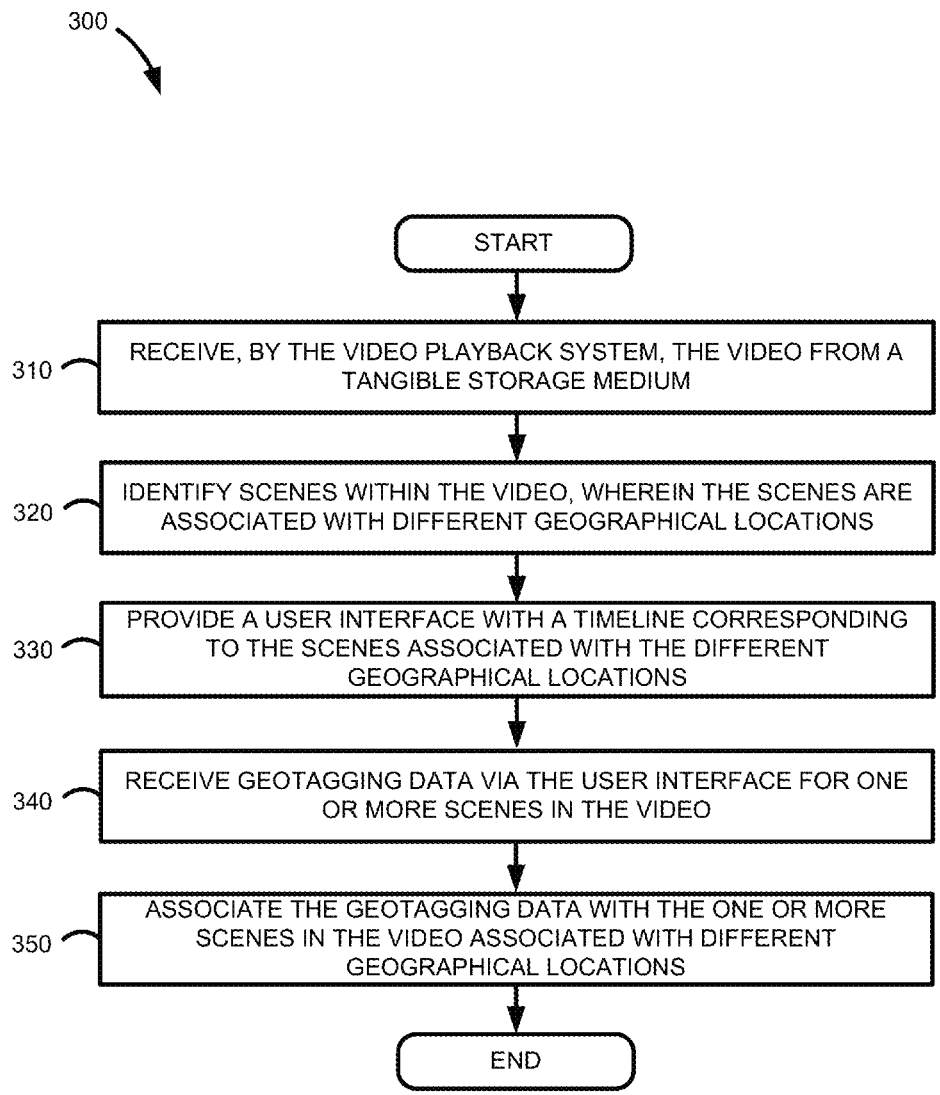
FIG. 3, which is a flowchart for an embodiment for incorporating geotagging data into a video received at the video playback system of FIG. 1.

Reference is now made to FIG. 3, which is a flowchart 300 for a method for incorporating geotagging data into a video content 115 received at the video playback system 102 of FIG. 1. If embodied in software, each block depicted in FIG. 3 represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as a processor in a computer system or other system such as the one shown in FIG. 1. The machine code may be converted from the source code, etc. If embodied in hardware, each block may represent a circuit or a number of interconnected circuits to implement the specified logical function(s).

Although the flowchart 300 of FIG. 3 shows a specific order of execution, it is understood that the order of execution may differ from that which is depicted. Beginning in block 310, video content 115 is received by the video playback system 102. For some embodiments, the video content 115 is received from a tangible storage medium. As discussed earlier, the tangible storage medium may comprise, by way of example and without limitation, a CD 120, a USB flash drive 122, and an external hard drive 126. In other embodiments, the video content 115 is received from the one or more video sharing websites 132 depicted in FIG. 1. In block 320, scenes are identified within the video. In accordance with some embodiments, scenes may be identified based on metadata associated with the video, scene changes, the motion of objects, and so on. For example, the metadata associated with a video may specify pre-defined chapters within the video, which the scene detector 112 (shown in FIG. 1) utilizes to identify scenes. The scene detector 112 may also be configured to analyze the video on a frame-by-frame basis and analyze such attributes as camera motion (e.g., panning motion, zooming in/out), the motion and/or presence of objects/individuals, change in audio, change in lighting, and other attributes. For some embodiments, the scenes are associated with different geographical locations where the scene detector 112 of FIG. 1 identifies scenes within the video based on a change in geographical location. For example, the scene detector 112 may identify a scene change based on the introduction of trees/mountains or other objects such as buildings into the background. In block 330, a user interface is provided, where the user interface includes a geo-based timeline that corresponds to the scenes associated with the different geographical locations. In block 340, geotagging data is received via the user interface for one or more scenes within the video, and in block 350, the geotagging data is associated with the one or more scenes in the video associated with different geographical locations.

Referring back briefly to FIG. 2, in accordance with some embodiments, default geotagging data 127 is assigned for each identified scene within the video. Note that default geotagging data 127 is generally assigned if the scenes do not have any assigned geotagging data. For some implementations, default geotagging data 127 may be assigned according to geotagging data associated with other scenes in the same general vicinity, where initial geotagging data is read from a tangible storage medium 120, 122, 126 or from a geotagging data server 136 (shown in FIG. 1) storing meta data relating to the video content 115. In other implementations, the default geotagging data 127 is assigned based on metadata received from a geotagging data server 136. The default geotagging data 127 serves as a starting point, and the video playback system 102 receives updated geotagging data via a user interface. For example, the default geotagging data 127 may simply comprise the name or coordinates of the geographical location for the opening scene. As described in more detail below, the video playback system 102 may receive other types of geographical data, including but not limited to, maps, Uniform Resource Locators (URLs), web pages, commentary, location-specific news, and other types of data. For some embodiments, when a CD 120 is received by the video playback system 102, the video playback system 102 reads a disc identifier (also known as "disc ID") 123, which identifies the title and/or content on the CD 120. Default geotagging data 127 may be retrieved either from local memory 214 or from a remote server based on the disc identifier 123.

Figure 4:
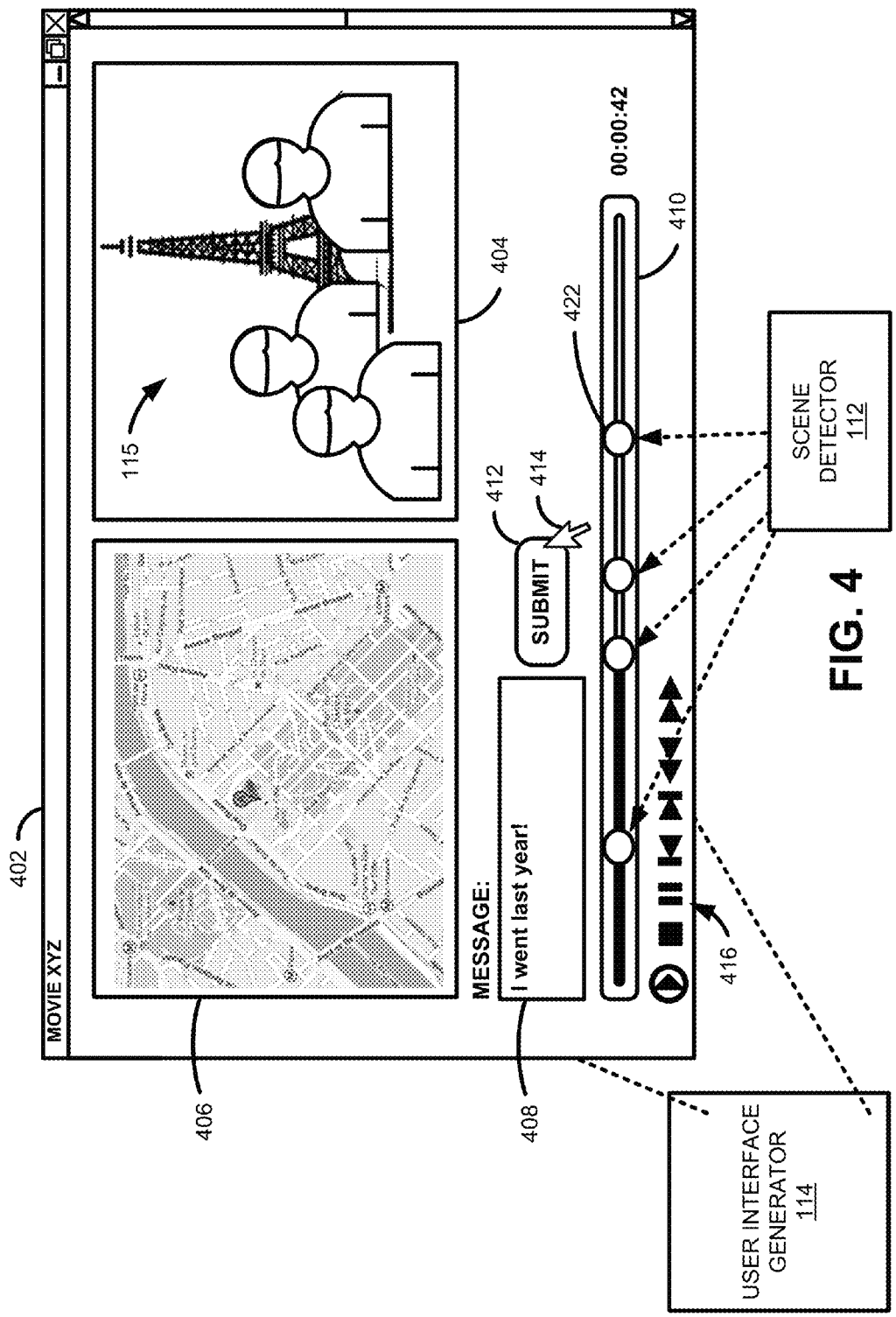
FIG. 4 illustrates an example user interface provided by the user interface generator of FIG. 1 for receiving geotagging data.

To further illustrate the geotagging process, reference is made to FIG. 4, which illustrates an example user interface 402 provided by the user interface generator 114 of FIG. 1 for receiving geotagging data. The user interface 402 includes a display panel 404 for displaying the video content 115. The user interface 402 further comprises a panel 406 for displaying geotagging data. For the non-limiting example shown, the panel 406 displays a map that corresponds to the scene currently shown on the display panel 404. The user interface 402 further comprises a text box 408 for displaying comments and/or questions posted by users. Next to the text box is a button 412 that allows a user to submit comments/responses. The user interface 402 also comprises playback buttons 416 for pausing playback.

As will be described in connection with FIGS. 5, 6, 7A, 7B, the geo-based timeline 410 shown includes one or more distinct sets of visual markers for indicating tagged scenes within the video where each distinct set of visual markers corresponds to a type of geotagging data. The user navigates the user interface 402 using a mouse pointer (or mouse cursor) 414. The geo-based timeline 410 may initially display default markers 422 to show the location of scenes identified by the scene detector 112 in FIG. 1. For some embodiments, the default markers 422 coincide with scene changes identified by the scene detector 112. Alternatively, the default markers 422 may coincide with scenes specified by the default geotagging data 127 in FIG. 2, where the default geotagging data 127 is displayed when playback progresses to each default marker 422. For example, the default geotagging data 127 may simply comprise the name or coordinates of the location corresponding to the current scene of the move. As described below, the various embodiments allow users to change or add geotagging data to the movie to enhance the viewing experience. Thus, instead of only displaying default geotagging data (e.g., the name or coordinates of a location), other information such as, but not limited to, location-specific news, maps, and commentary may be displayed as well.

FIG. 5 illustrates the use of various visual markers with the geo-based timeline 410 of FIG. 4. As shown in the non-limiting example, the geo-based timeline 410 comprises various sets of visual markers 502a-c, 504, 506 placed on various points of the timeline. In accordance with some embodiments, the visual markers 502a-c, 504, 506 may be aligned with the scenes 422 identified by the scene detector 112 in FIG. 4 where the default markers 422 were previously located. As playback progresses to each visual marker 502a-c, 504, 506, geotagging data corresponding to the particular type of visual marker 502a-c, 504, 506 is displayed. As will be discussed below, in some instances, users are prompted for geotagging data, which results in a change of appearance of the visual marker to indicate that geotagging data has been assigned.

For some embodiments, the user uses the mouse pointer 414 to specify a particular type of visual marker. The user's selection may be received, for example, via a context menu 530 as shown in FIG. 5. For some implementations, the user performs a right-click on the mouse pointer 414 to invoke the context menu 530 and converts the default marker 422 to another type of visual marker. For example, the user pauses playback and selects the diamond-shaped marker 504 to specify that a map of the current scene is to be displayed at that particular point in the timeline. The user may then input a link to a map corresponding to the location of the current scene. For the illustration in FIG. 5, the link corresponding to the diamond-shaped marker 504 may comprise, for example, a link to Google Maps® which shows the area surrounding the Eiffel Tower. Thus, the next user viewing the same title will see the map during playback. Note that the map may also be a fictional map such as a map depicting the world in such films as "The Lord of the Rings," the Harry Potter series, The Chronicles of Narnia series, or the like.

To further illustrate the geotagging process, reference is made to FIG. 6. For various embodiments, each distinct visual marker 602, 604, 606 corresponds to a different type of geotagging data. As a non-limiting example, the first visual marker 602 corresponds to map data. The second visual marker 604 may, for example, correspond to a web page that contains geographical information relating to the current scene. The third visual marker 606 may comprise comments and/or questions for users to view and respond to. Other geotagging data types include weather forecast data, location-specific advertisements, location-specific news, and so on.

When the user moves the mouse pointer 414 over a particular visual marker, the corresponding geotagging data is displayed. In the example shown, a web page is displayed when the user moves the mouse pointer 414 over the diamond-shaped marker 604. Furthermore, if more than one type of geotagging data has been assigned, other users may use a context menu 603 or other selection means to view a particular type of geotagging data. Note that the context menu 530 in FIG. 5 is used to change the default marker 422 to a particular type of geotagging data type, whereas the context menu 603 shown in FIG. 6 is used to view a particular type of geotagging data. That is, the context menu 530 in FIG. 5 is used during the entry of geotagging data, while the context menu 603 in FIG. 6 is used to view geotagging data that has been assigned. For example, the user can perform a right-click and select the diamond shape marker 604 to view a web page related to the location of the current scene.

Figure 7A:
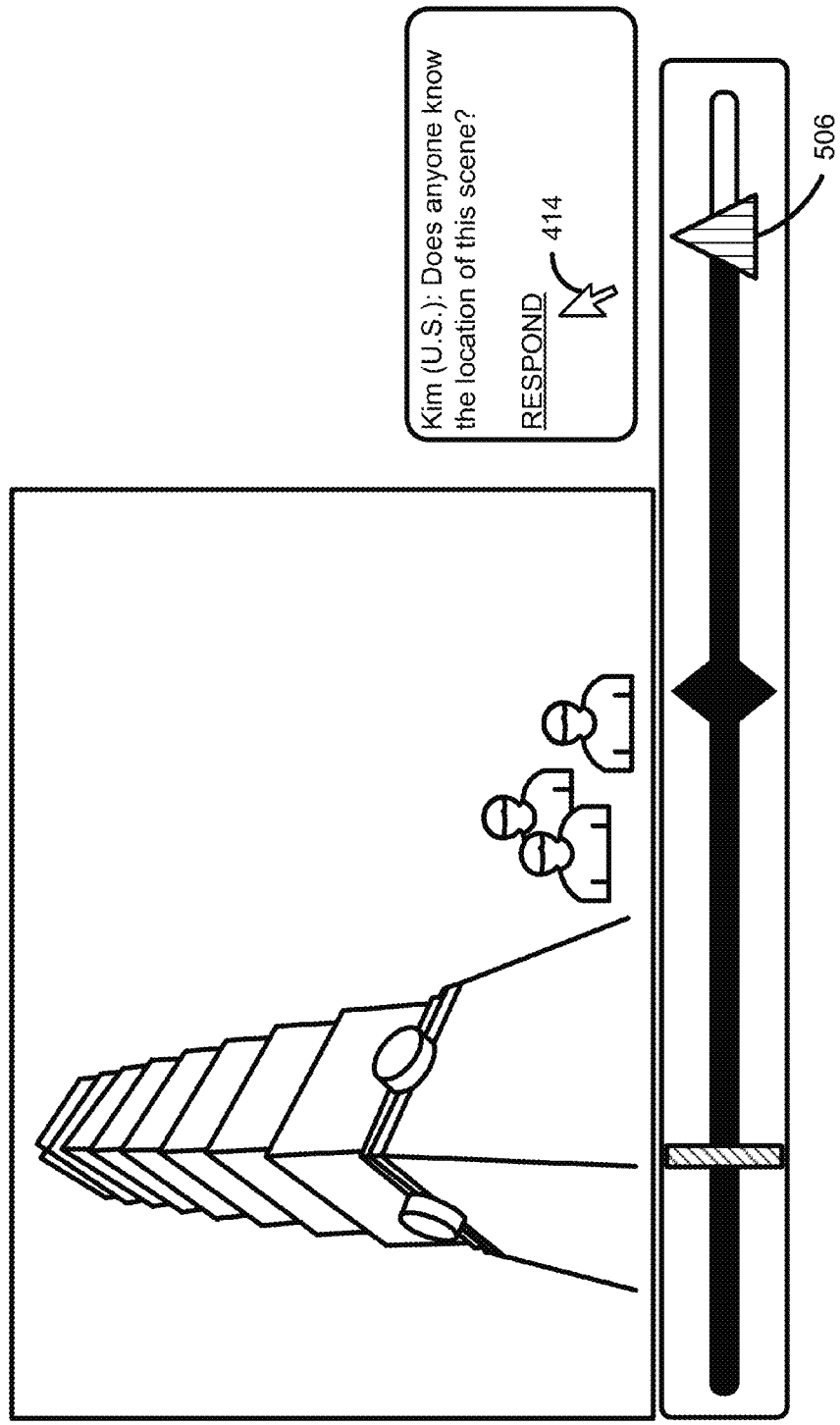
FIGS. 7A-7B illustrate an example of a geotagging operation.
Figure 7B:
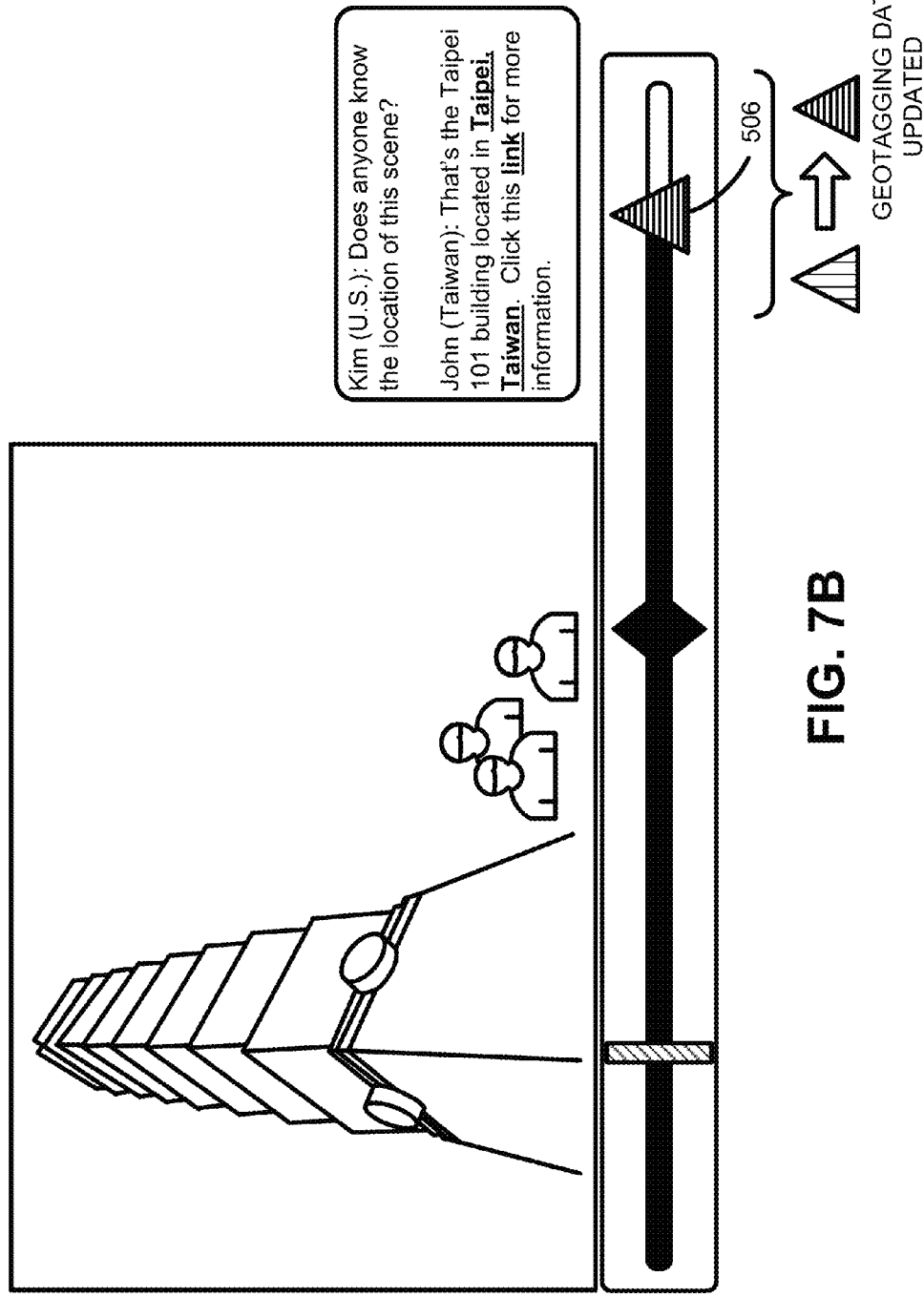

FIGS. 7A-7B illustrate another example of a geotagging operation. As shown in FIG. 7A, a question is posted when playback of the video content 115 progresses to the triangle-shaped marker 506. This may be based on geotagging performed by a prior user viewing the same title. Specifically, the user may have used the context menu 530 in FIG. 5 to change the default marker 422 to a triangle marker 506 to indicate that commentary and/or questions will be shown when playback progresses to that marker 506. Using the mouse pointer 414, the current user can reply to the question by clicking on the "Respond" link set up by the prior user. In accordance with some embodiments, the marker 506 may change appearance (e.g., change in color, shape) once a response is received at the video playback system 102 to indicate that geotagging data has been assigned. Turning to FIG. 7B, a current user (John) replies to Kim's query by specifying the location of the building and providing additional information. Upon receiving the response from John, the marker 506 changes appearance to indicate that the location of the current scene has been identified and that the geotagging data for that marker 506 has been updated.

Figure 8:
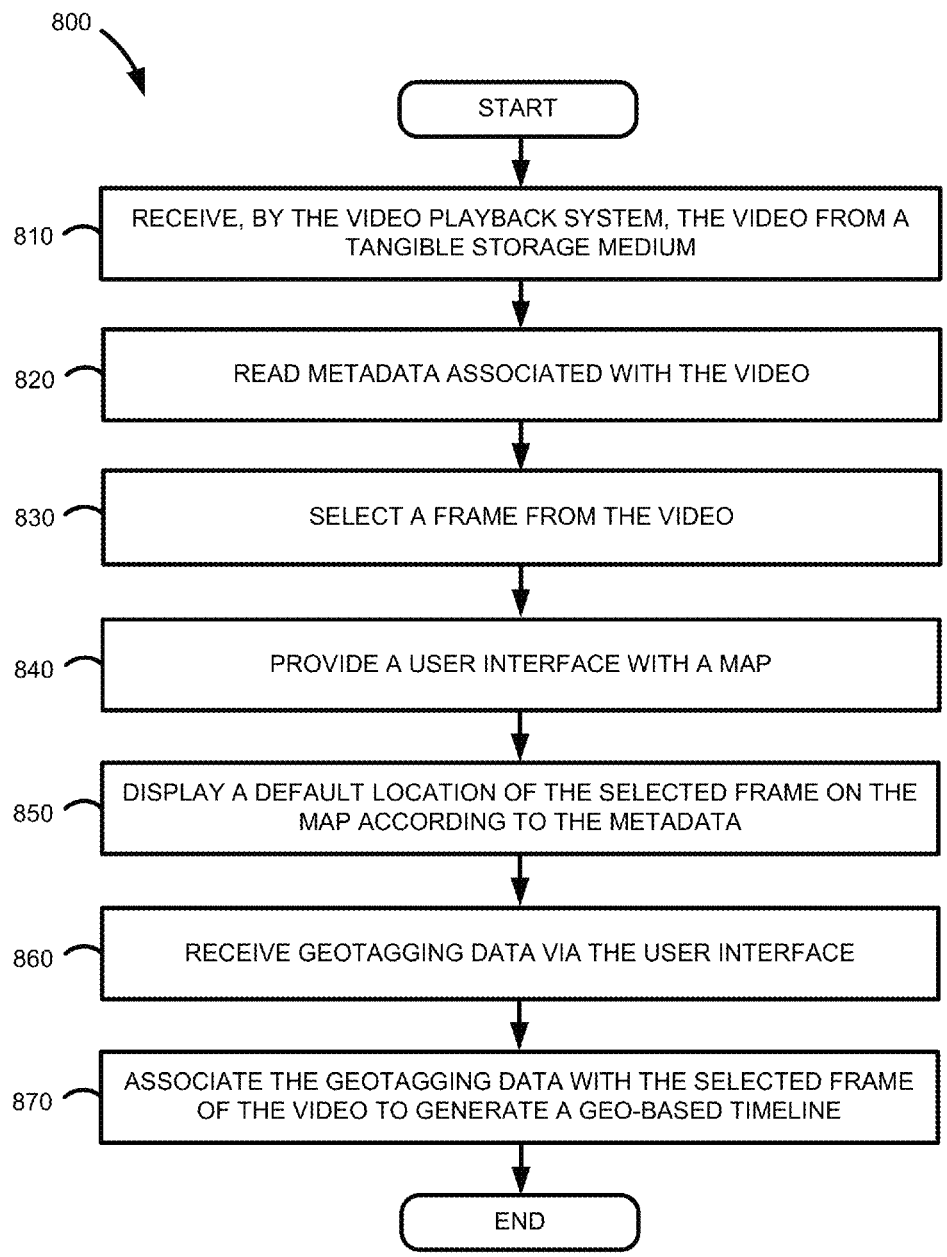
FIG. 8 is a flowchart for an alternative embodiment for incorporating geotagging data into a video received at the video playback system of FIG. 1.

Reference is now made to FIG. 8, which is a flowchart 800 for an alternative embodiment for incorporating geotagging data into a video content 115 received at the video playback system 102 of FIG. 1. As with the flowchart in FIG. 3, if embodied in software, each block depicted in FIG. 8 represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as a processor in a computer system or other system such as the one shown in FIG. 1. The machine code may be converted from the source code, etc. If embodied in hardware, each block may represent a circuit or a number of interconnected circuits to implement the specified logical function(s).

Although the flowchart 800 of FIG. 8 shows a specific order of execution, it is understood that the order of execution may differ from that which is depicted. Beginning in block 810, video content is received by a video playback system 102 from a tangible storage medium, such as a CD 120, a USB flash drive 122, and an external hard drive 126, as described in connection with FIG. 1. The method further comprises reading metadata associated with the video (block 820), selecting a frame from the video (block 830), providing a user interface with a map (block 840), displaying a default location of the selected frame on the map according to the metadata (block 850), receiving geotagging data via the user interface (block 860), and associating the geotagging data with the selected frame of the video to generate a geo-based timeline (block 870).

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method implemented in a video playback system including a video editing interface for assigning geotagging data to a video, comprising:

receiving, by the video playback system, the video from a tangible storage medium;

reading metadata associated with the video;

selecting a frame from the video;

providing a user interface with a map;

displaying a default location of the selected frame on the map according to the metadata;

receiving geotagging data via the user interface;

associating the geotagging data with the selected frame of the video to generate a geo-based timeline in the user interface;

parsing frames with the video;

identifying a scene corresponding to the selected frame; and determining the default location according to a frame in a vicinity of the selected frame, wherein both the selected frame and the determined frame correspond to a same identified scene, wherein the determined frame is associated with the default location upon reading metadata associated with the video.

2. The method of claim 1, wherein reading metadata associated with the video comprises reading the metadata from one of: the tangible storage medium and a geotagging data server.

3. The method of claim 1, wherein receiving geotagging data via the user interface comprises receiving one of:
a confirmation that the default location is correct; and
an indication on the map specifying a new location for the default location.

4. The method of claim 1, further comprising:
reading an identifier associated with the video; and
determining the default location according to the identifier, the metadata, and the selected frame, wherein the default location is retrieved from a geotagging data server.

5. The method of claim 4, further comprising displaying the geotagging data associated with the identifier of the video on the geo-based timeline.

6. The method of claim 4, further comprising uploading the geotagging data to the geotagging data server.

7. The method of claim 1, further comprising:
based on whether the selected frame has any associated geotagging data, determining the default location of the selected frame according to a first marked frame with associated geotagging data.

8. The method of claim 7, wherein the scene is identified by determining a scene change.

9. The method of claim 1, wherein the metadata comprises one or more of: title information, scene change information, subtitles, and commentary data.

10. The method of claim 1, further comprising storing the geotagging data in a local storage.

11. The method of claim 1, wherein generating a user interface with a geo-based timeline comprises displaying one or more of: identified scenes, commentary data, and geotagging data.

12. The method of claim 11, wherein the commentary data comprises one or more of: user comments and user questions.

13. The method of claim 12, wherein receiving geotagging data via the user interface comprises receiving the geotagging data in response to the displayed commentary data.

14. The method of claim 1, wherein providing a user interface with a geo-based timeline according to the identified scenes marked comprises:
based on movement of a cursor controlled by a user over a scene, displaying a map of a geographical area corresponding to geotagging data associated with the scene.

15. The method of claim 1, further comprising displaying one or more videos based on the geotagging data associated with the video.

16. The method of claim 15, wherein the one or more videos include at least one scene with at least one geographical location common to the video.

17. A system for assigning geotagging data to a video, comprising:
a receiver configured to receive the video from a tangible storage medium and metadata associated with the video;
a scene identifier configured to identify scenes based on frames within the video;
a user interface module configured to provide a user interface with a map, the user interface module further configured to display a default location of a selected frame on the map according to the metadata; and
a geotagger configured to associate the geotagging data with tagged scenes within the video and generate a geo-based timeline, wherein the scene identifier is further configured to parse frames with the video and identifying a scene corresponding to the selected frame, the scene identifier further configured to determine the default location according to a frame in a vicinity of the selected frame wherein both frames correspond to a same identified scene, wherein the frame in the vicinity of the selected frame is associated with the default location upon the receiver reading metadata associated with the video.

18. The system of claim 17, wherein the receiver reads the metadata from one of: the tangible storage medium and a geotagging data server.

19. The system of claim 17, wherein the receiver is further configured to read an identifier associated with the video and determine the default location according to the identifier, the metadata, and the selected frame, wherein the default location is retrieved from a geotagging data server.

20. The system of claim 19, wherein the user interface module is configured to display the geotagging data associated with the identifier of the video on the geo-based timeline.

21. The system of claim 19, wherein the geotagger is configured to upload the geotagging data to the geotagging data server.

22. The system of claim 17, wherein the scene identifier identifies a scene according to scene changes.

23. The system of claim 17, wherein the metadata comprises one or more of: title information, scene change information, subtitles, and commentary data.

24. The system of claim 17, wherein the geo-based timeline comprises one or more sets of visual markers for indicating tagged scenes within the video.

25. The system of claim 24, wherein characteristics of the one or more visual markers correspond to a type of geotagging data.

26. The system of claim 25, wherein the characteristics of the one or more visual markers comprise one or more of: a shape of the visual marker and a color of the visual marker.

27. The system of claim 25, wherein the type of geotagging data comprises: text, images, uniform resource locators (URLs), video content, audio content, and third party applications.

28. The system of claim 27, further comprising storing the geotagging data in a local storage.

29. A method implemented in a video playback system for assigning geotagging data to a video, comprising:
receiving, by the video playback system, the video from a tangible storage medium;
identifying scenes within the video, wherein the scenes are associated with different geographical locations;
providing a user interface with a geo-based timeline corresponding to the scenes associated with the different geographical locations;
receiving geotagging data via the user interface for one or more scenes in the video;
associating the geotagging data with the one or more scenes in the video associated with different geographical locations;
parsing frames with the video;
identifying a scene corresponding to a selected frame; and
determining a default location according to a frame in a vicinity of the selected frame, wherein both the selected frame and the determined frame correspond to a same identified scene, wherein the determined frame is associated with the default location upon reading metadata associated with the video.

30. The method of claim 29, wherein the geotagging data comprises: text, images, uniform resource locators (URLs), video content, audio content, and third party applications.

31. The method of claim 29, further comprising:
based on movement of a cursor controlled by a user over a scene among the one or more scenes, displaying a geographical map corresponding to geotagging data associated with the scene.

32. The method of claim 29, wherein the geo-based timeline comprises one or more distinct sets of visual markers for indicating tagged scenes within the video, wherein each distinct set corresponds to a type of geotagging data.

33. The method of claim 32, wherein the one or more distinct sets of visual markers are set based on one or more selections received at the video playback system from a user.

34. The method of claim 29, further comprising assigning default geotagging data to each of the identified scenes within the video, wherein the default geotagging data is received by the video playback system from one of: a tangible storage medium and a remote server.

35. A method implemented in a video playback system for assigning geotagging data to a video, comprising:
identifying, by the video playback system, scenes associated with different geographical locations within the video;
providing a user interface with a geo-based timeline corresponding to the identified scenes associated with different geographical locations;
receiving geotagging data via the user interface for one or more scenes in the video;
associating the geotagging data with the one or more scenes in the video associated with different geographical locations;
parsing frames with the video;
identifying a scene corresponding to a selected frame; and
determining a default location according to a frame in a vicinity of the selected frame, wherein both the selected frame and the determined frame correspond to a same identified scene, wherein the determined frame is associated with the default location upon reading metadata associated with the video.

36. The method of claim 35, further comprising receiving, by the video playback system, the video from a video sharing website.

37. The method of claim 35, wherein the geotagging data comprises: text, images, uniform resource locators (URLs), video content, audio content, and third party applications.

38. The method of claim 35, further comprising:
based on movement of a cursor controlled by a user over a scene among the one or more scenes, displaying a geographical map corresponding to geotagging data associated with the scene.

39. The method of claim 35, wherein the geo-based timeline comprises one or more distinct sets of visual markers for indicating tagged scenes within the video, wherein each distinct set corresponds to a type of geotagging data.

40. The method of claim 39, wherein the one or more distinct sets of visual markers are set based on one or more selections received at the video playback system from a user.

41. The method of claim 35, further comprising assigning default geotagging data to each of the identified scenes within the video, wherein the default geotagging data is received by the video playback system from one of: a tangible storage medium and a remote server.

* * * * *